Feb. 13, 1945.  J. MARZIANI  2,369,362

PRESSURE APPLICATOR

Filed June 5, 1942  2 Sheets-Sheet 1

WITNESSES:
Thomas W. Kerr, Jr.
Hubert Fuchs

INVENTOR:
Joseph Marziani,
BY Paul & Paul
ATTORNEYS.

Feb. 13, 1945.    J. MARZIANI    2,369,362
PRESSURE APPLICATOR
Filed June 5, 1942    2 Sheets-Sheet 2

INVENTOR:
Joseph Marziani,
BY Paul Paul
ATTORNEYS.

Patented Feb. 13, 1945

2,369,362

UNITED STATES PATENT OFFICE 2,369,362

PRESSURE APPLICATOR

Joseph Marziani, Philadelphia, Pa., assignor of one-half to Frank Evans Bowker, Philadelphia, Pa.

Application June 5, 1942, Serial No. 445,989

6 Claims. (Cl. 154—42)

This invention relates to pressure applicators, that is to say, to devices useful in carrying out various operations in connection with which the application of firm uniform pressure by clamp action is desirable.

For convenience of illustration herein I have shown and described my invention as embodied in the form of a device suitable for pressing, for the purpose of heat bonding, superposed plies of Cellophane or other thermoplastic materials, as for example the collapsed mouths of filled bags, or other packages or wrappers made from such material.

My invention is broadly directed toward enabling pressing operations to be performed quickly and effectively to the avoidance of destructive injury to the work, and in the specific instances above referred to, to make it possible to effect a perfect air-tight bond between the plies of the work without danger of burning.

The foregoing advantages I realize in practice, as hereinafter more fully set forth, through provision of a simple inexpensive, and easily operated device wherein a normally retracted lever actuated through a toggle means effectively exerts positive uniform pressure to the work—in the illustrated embodiment, presses the superposed plies of the thermoplastic material against a heated surface which is automatically maintained at a predetermined temperature just sufficient to cause cohesion between the plies, by regulatable thermostatic means.

Other objects and attendant advantages will appear from the following detailed description of the attached drawings, wherein Fig. 1 is a side elevation of a pressure applicator conveniently embodying my invention in one form.

Figure 7:
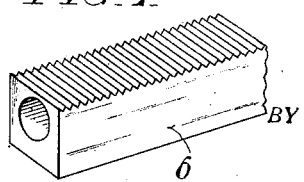
Fig. 7 is a fragmentary perspective view showing an alternative form of one of the parts of the device.

As delineated in Figs. 1–5, my improved pressure applicator has a flat base 5 whereon is mounted at one end a transverse pressure ridge 6 which has a lengthwise hollow containing an electric heating unit 7 whereof the coil is indicated at 8. The ridge 6 may be integrally formed with the base 5, but, for convenience it is herein shown as being separately formed as an elongate bar of rectangular cross section and secured to said base by means of screws 9. The top of the ridge 6 is in this instance longitudinally grooved as at 10 to provide a broken heating surface upon which the retroverted plies of the mouth of a thermoplastic bag B or the like are placed during the bonding. By virtue of the detachability of the bar 6 from the base 5, it is possible to substitute others such as the one illustrated in Fig. 7 having transverse ridges or serrations on its top surface depending upon the character of the work which is to be acted upon.

Arranged to firmly and uniformly press the work against the heating surface of the ridge 6 is an elongate pad 11 of yielding material such as rubber or felt, said pad being attached to the underside of a cross head 12 at the swinging end of an upwardly arched arm 13 which is fulcrumed to rock on a fixed transversely extending pin 15. Also pivoted on the pin 15 is a double ended lever 16 whereof the forward extremity 16a corresponds generally in form to the arm 13 and is secured to the head 12 by a screw 17. The auxiliary screw shown at 17a serves as a means for adjusting the head 12 in respect to the extremity 16a of the lever 16. The other or rearward extremity 16b of the lever 16 is connected at 18 to the top ends of the upper pair of links 19a of a vertically arranged compound toggle 19, the lower links 19b of which are pivotally connected at their bottom ends at 20 to laterally-spaced ears 21 upstanding from the base 5. The means provided for actuating the toggle 19 includes a solenoid 22 horizontally-arranged whereof the coil 23 is supported by a frame 25 secured, with capacity for adjustment toward and away from the fixed fulcrum 15 of the lever 16, to the supporting base 5 by screws 26. The movable armature 27 of the solenoid 22 extends inwardly from a cross head 28 which has its ends 29 confined in longitudinal guideways 30 on the solenoid supporting frame 25. As shown, a horizontal thrust link 31 couples the common connecting pin 32 for the toggle links 19a and 19b with a pin 33 mounted centrally of the cross head 28. Leftward movement of the toggle 19 under the influence of the solenoid 22 is yieldingly resisted by a pair of parallel coiled tension springs 35, each such spring being connected at one end to the center pin 32 of said toggle, and at the other end to a fixed anchorage

36. Rising perpendicularly from the base 5 in the interval between the ridge 6 and the solenoid 22 is a support in the form of a bridge 37. At their lower ends the side members or uprights 37a of the bridge 37 are secured, by means of screws 38, to upstanding lugs 39 on the base 5, said lugs constituting bearings for the opposite ends of the pin 15 whereon the lever 16 is pivoted and carrying the anchorages 36 for the springs 35. Extending rearwardly from the top 37b of the bridge 37 is a carrying handle 40 adjacent the front of which is a push button switch 41 for controlling the flow of electric current to the solenoid coil 23. Current is supplied through a conductor cord 42 which extends into the hollow of the handle 40, and by suitable branch conductors 43, 44 and 45, 46, see Fig. 4, the heating coil 8 and the solenoid coil 23 are connected in parallel across the conductors 47 and 48 of the cable cord 42, with the switch 41 interposed between the leads 45, 46.

For the purpose of automatically maintaining a predetermined temperature at the heating surface of the pressure ridge 6, I have shown at 50, a thermostatic switch which is connected in the circuit of the heating coil. This thermostatic switch 50 may be of any approved commercial type capable of adjustment by means of a screw 51 to open the heating coil circuit when the desired temperature is reached.

The sheet metal cover shown at 52 serves to protect the solenoid and the directly associated parts, and also serves as a guard to protect the operator's hand against injury by preventing contact with the movable parts beneath the handle 40.

Figure 1:
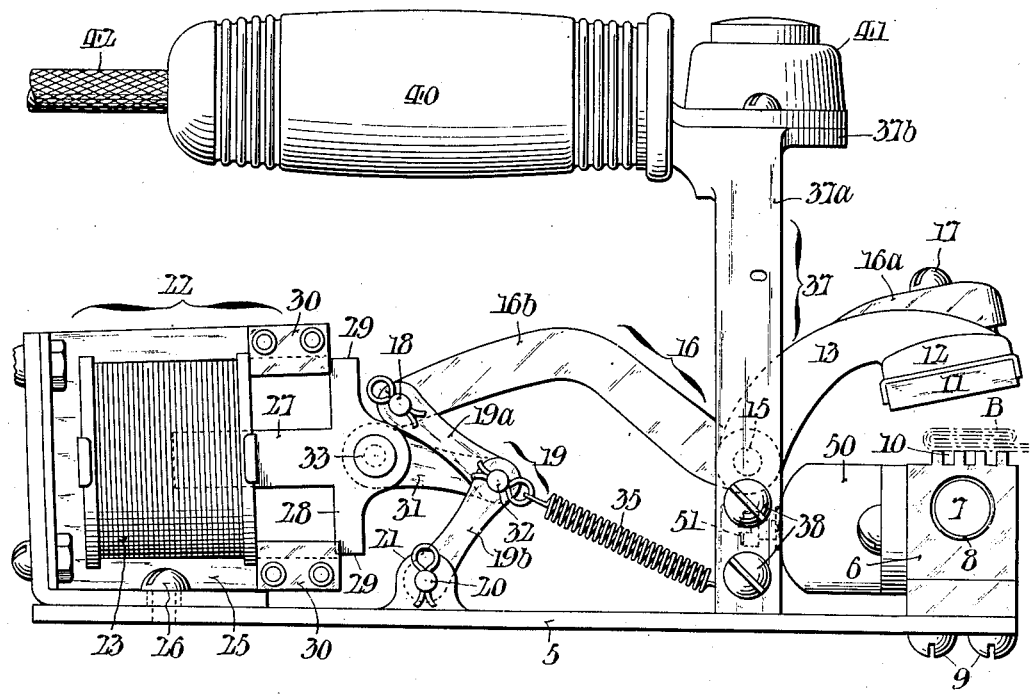
Figure 5:
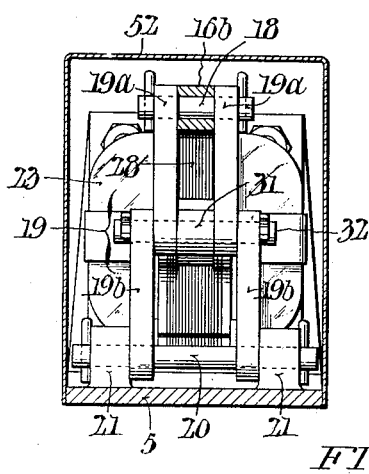
Fig. 5 is a transverse sectional view taken as indicated by the angled arrows V—V in Fig. 2.

In use, the device when open as in Fig. 1, is positioned so that the superposed plies of the thermoplastic material rest on the heated top surface of the ridge 6, and when this is accomplished, the operator pushes the button 41 with the result that the solenoid 22 is energized and the lever 16 thereby actuated through the toggle 19 to bring the pad 11 into momentary pressure contact with the work. The button 41 is then released to interrupt current flow to the solenoid 22, whereupon, under the action of the springs 35, the toggle 19 is automatically collapsed and the lever 16 actuated to withdraw the pad 11 from the work. In practice, the solenoid 22 is adjusted for position with respect to the fulcrum 15 of the lever 16 so that the toggle 19, when actuated, will not be moved past dead center. Under these circumstances, the lever 16 will exert full pressure upon the work so long as the push button 41 is held depressed. Such adjustability of the solenoid 22 is also of importance in that it enables adaptation of the device for proper and effective operation upon ply piles of different thicknesses. Adjustment of the head 12 with respect to the extremity 16a of the lever 16 by means of the screw 17a will likewise be attended by a change in the interval between said head and the pressure block when the device is in open position.

Figure 6:
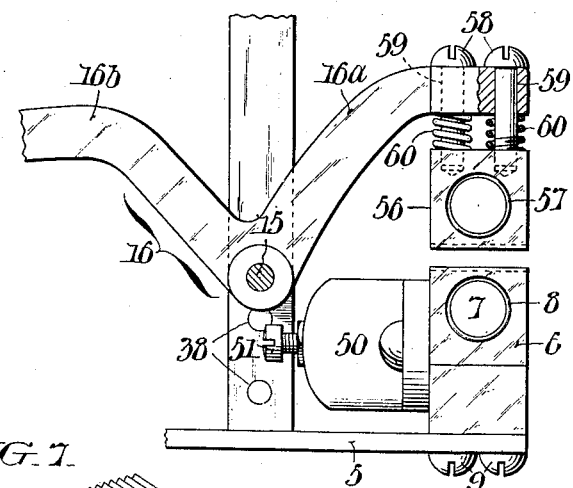
Fig. 6 is a fragmentary view corresponding to Fig. 2 and showing a modified embodiment of my invention.
Figure 2:
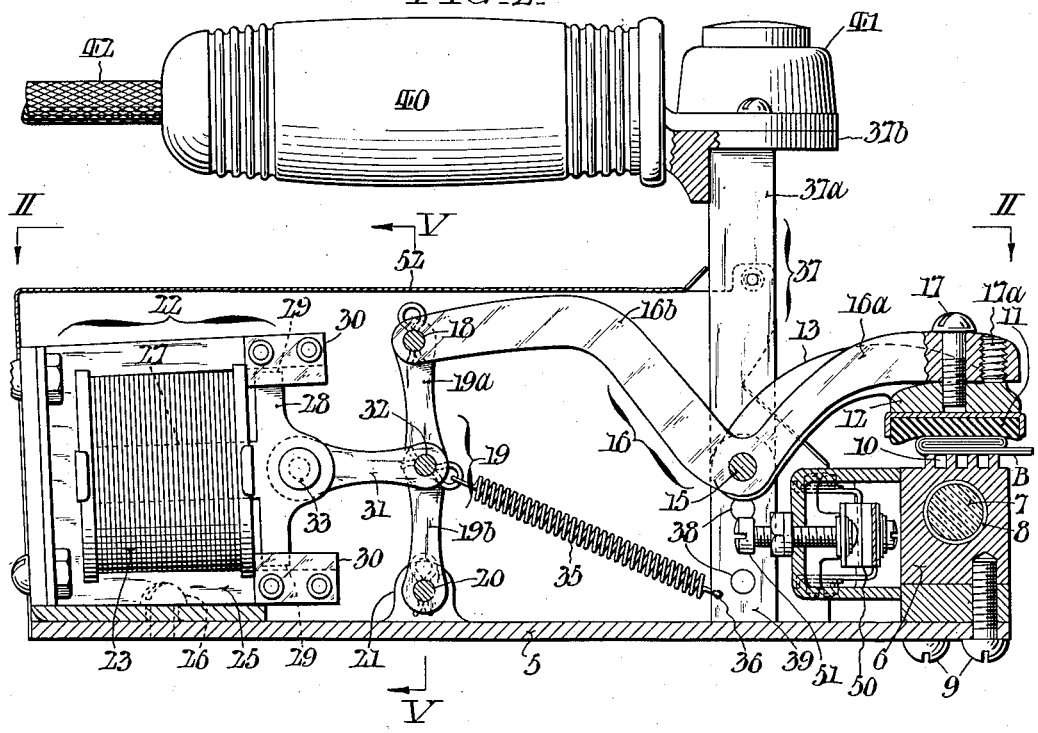
Fig. 2 is a longitudinal sectional view of the device.
Figure 3:
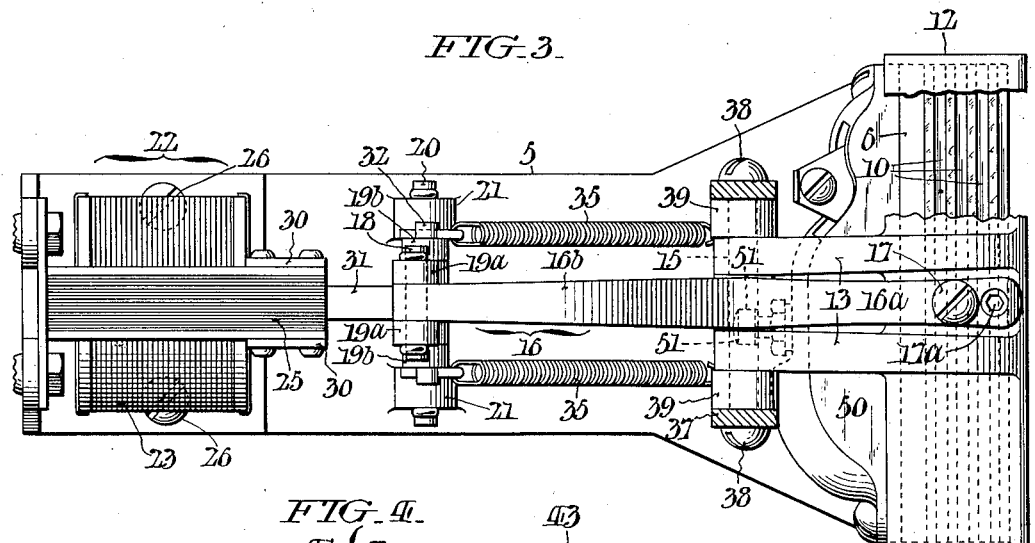
Fig. 3 is a horizontal sectional view taken as indicated by the angled arrows III—III in Fig. 2 with a portion broken out to expose an important structural detail.
Figure 4:
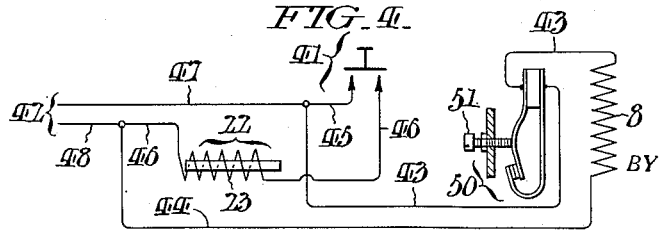
Fig. 4 is a wiring diagram of the device.

In instances where it is desirable or necessary to heat both sides of the work to insure proper cohesion between the plies, I resort to the modified construction illustrated in Fig. 6 wherein the padded head 12 of Figs. 1 and 2 is replaced by a hollow bar 56. As shown the bar 56 contains a heating coil 57, which through suitable conductors (not illustrated), is connected in parallel with the coil 7 in the bar 6, and like the latter coil arranged to be automatically controlled by the thermostatic switch means 50. The bar 56 is supported by headed screws 58 whereof the shanks pass with capacity for free axial sliding movement through vertical apertures 59 in the extremity 16a of the lever 16. Helical compression springs 60 surrounding the exposed portions of the shanks of screws 58 between the lever extremity 16a and the bar 56, allow a yielding action to take place when said bar comes into contact with the work in a manner readily understood from Fig. 6.

Through suitable modifications within the scope of certain of the appended claims, the pressure applicator of my invention may be readily adapted to purposes other than that herein described by way of example, such for instance as cancelling bank checks, clinching staples, perforating sheet materials, etc., where the application of uniform and positive pressure is necessary or required.

It is to be understood that in the use of the device, the thermostatic switch 50 is set to keep the pressure ridge 6 at a temperature which will insure effective cohesion between the plies of the work under pressure without danger of burning the material or weakening it over the merged areas.

Having thus described my invention, I claim:

1. A portable pressure applicator of the character described comprising a horizontal supporting member with a carrying handle; an anvil at one end of the supporting member; a lever with fulcrum support on the supporting member and carrying a pad to cooperate with the anvil; a toggle couple connected at one end to the lever and at the other end to the supporting member; and actuating means including an electro magnet armature connected to the toggle at its mid-pivot to cause movement of the lever for contact of the pad on the latter with the anvil, spring means tending to keep the toggle collapsed with the pad on the lever withdrawn from the anvil, and switch means accessible at the handle for controlling flow of electric current to the solenoid.

2. A portable pressure applicator of the character described comprising a horizontal supporting member with a carrying handle; a hollow anvil at one end of the supporting member; an electric heating coil within the hollow of the anvil; a lever with fulcrum support on the supporting member and carrying a pressure pad to cooperate with the anvil; and actuating means including an electromagnet an armature associated with the magnet and connected to the lever for moving it to bring its pad into contact with the anvil, spring means operative upon the lever to normally maintain the pad withdrawn from the anvil, switch means accessible at the handle, and a circuit connecting the heating coil and the magnet for simultaneous control of current flow to them by said switch means.

3. The invention according to claim 2 in which the pad is also hollow and contains a heating coil; and in which the latter coil is likewise connected in the circuit with the electromagnet for simultaneous control by the switch means.

4. A portable pressure applicator of the character described comprising a horizontal supporting member with an upstanding bracket intermediate its ends; a horizontal carrying handle reaching rearwardly from the top of the bracket; an anvil at the front end of the supporting member; a longitudinally-disposed forwardly-reaching lever movable up and down about a fulcrum on the bracket and carrying a pressure pad to cooperate with the anvil; a vertically-arranged toggle couple pivotally connected at one end to a rearward extension of the lever and at the other end to the supporting member; and actuating means including a solenoid with its armature connected to the mid-pivot of the toggle and operative to cause contact of the pad on the lever with the anvil; spring means also connected to the mid-pivot of the toggle for collapsing the latter when the solenoid is deenergized for withdrawal of the pad from the anvi and switch means accessible at the handle fo. controlling current flow to the solenoid.

5. The invention according to claim 4, in which the anvil is hollow and contains an electric heating coil; and in which the heating coil is connected in circuit with the solenoid so as to be controllable with the latter by the switch means.

6. The invention according to claim 4, in which the anvil and the cooperating pad are both hollow and contain heating coils; and in which said heating coils are in circuit with the solenoid so as to be controllable with the latter by the switch means.

JOSEPH MARZIANI.